(12) United States Patent
Khokhar et al.

(10) Patent No.: US 10,095,504 B1
(45) Date of Patent: Oct. 9, 2018

(54) AUTOMATED ANALYSIS SYSTEM AND METHOD

(71) Applicant: EMC IP Holding Company, LLC, Hopkinton, MA (US)

(72) Inventors: Muzhar Khokhar, Shrewsbury, MA (US); Charles S. Langley, Littleton, CO (US); Brian Tetreault, Upton, MA (US); Matthew Jean, Shirley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/199,227

(22) Filed: Jun. 30, 2016

(51) Int. Cl.
- *G06F 9/44* (2018.01)
- *G06F 8/65* (2018.01)
- *G06F 8/61* (2018.01)

(52) U.S. Cl.
CPC . *G06F 8/65* (2013.01); *G06F 8/61* (2013.01)

(58) Field of Classification Search
CPC ..................................... G06F 8/65; G06F 8/61
USPC .................................. 717/168, 169, 171, 174
See application file for complete search history.

(56) References Cited

U.S. PATENT DOCUMENTS

| | | | |
|---|---|---|---|
| 6,223,143 B1 | 4/2001 | Weinstock et al. | |
| 7,263,632 B2* | 8/2007 | Ritz | G06F 11/0709 714/25 |
| 7,865,888 B1 | 1/2011 | Qureshi et al. | |
| 7,966,278 B1 | 6/2011 | Satish | |
| 8,001,527 B1 | 8/2011 | Qureshi et al. | |
| 8,086,909 B1* | 12/2011 | Liu | G06F 11/0727 714/11 |
| 8,219,983 B1* | 7/2012 | Sobel | G06F 8/60 717/126 |
| 8,255,902 B1 | 8/2012 | Satish | |
| 8,694,983 B1 | 4/2014 | Sobel et al. | |
| 8,762,987 B1 | 6/2014 | Satish | |
| 8,806,037 B1* | 8/2014 | Kalra | H04L 41/028 709/223 |
| 9,594,624 B2 | 3/2017 | Charters et al. | |
| 9,672,086 B2* | 6/2017 | Barajas | G06F 11/0727 |
| 9,940,125 B1 | 4/2018 | Espy et al. | |
| 2003/0005362 A1* | 1/2003 | Miller | G06F 11/0727 714/27 |
| 2007/0198797 A1* | 8/2007 | Kavuri | G06F 3/061 711/165 |
| 2008/0077603 A1 | 3/2008 | Arnott | |
| 2008/0239965 A1* | 10/2008 | Tang | H04L 43/065 370/241 |
| 2009/0182812 A1 | 7/2009 | Bajpay et al. | |
| 2010/0135201 A1 | 6/2010 | Lewis et al. | |

(Continued)

OTHER PUBLICATIONS

Non-Final Office Action issued in U.S. Appl. No. 15/199,169 dated Sep. 25, 2017.

(Continued)

*Primary Examiner* — Phillip H Nguyen
(74) *Attorney, Agent, or Firm* — Mark H. Whittenberger; Heath M. Sargeant; Holland & Knight LLP

(57) ABSTRACT

A method, computer program product, and computing system for receiving telemetry data from a remote storage system. The telemetry data is analyzed to identify one or more issues with the remote storage system. One or more solutions are provided to the remote storage system based, at least in part, upon the one or more issues.

18 Claims, 3 Drawing Sheets

(56) References Cited

U.S. PATENT DOCUMENTS

| | | |
|---|---|---|
| 2011/0010518 A1* | 1/2011 | Kavuri .................. G06F 3/0647 |
| | | 711/165 |
| 2014/0019813 A1 | 1/2014 | Mclean et al. |
| 2014/0218229 A1 | 8/2014 | Pauly et al. |
| 2014/0337429 A1* | 11/2014 | Asenjo .................. H04L 65/403 |
| | | 709/204 |
| 2015/0074468 A1 | 3/2015 | Jacoby et al. |
| 2016/0132805 A1 | 5/2016 | Delacourt et al. |
| 2016/0364286 A1 | 12/2016 | Charters et al. |
| 2017/0063398 A1 | 3/2017 | Richardson et al. |
| 2017/0063399 A1 | 3/2017 | Richardson et al. |
| 2017/0147439 A1 | 5/2017 | Charters et al. |

OTHER PUBLICATIONS

Final Office Action issued in U.S. Appl. No. 15/199,169 dated Apr. 4, 2018.
Advisory Action issued in U.S. Appl. No. 15/199,169 dated Jul. 5, 2018.
Non-Final Office Action issued in U.S. Appl. No. 15/199,169 dated Jul. 26, 2018.

* cited by examiner

AUTOMATED ANALYSIS SYSTEM AND METHOD

TECHNICAL FIELD

This disclosure relates to analysis procedures and, more particularly, to analysis procedures for storage systems.

BACKGROUND

Storing and safeguarding electronic content is of paramount importance in modern business. Accordingly, various systems and methodologies may be employed to protect such electronic content.

The use of redundant high-availability storage systems is increasing in popularity. As would be expected, such redundant high-availability storage systems should be properly maintained in order for them to operate in a reliable fashion. Unfortunately, such maintenance may be complex in nature and may require IT professionals to perform numerous operations, such as software updates and firmware updates.

SUMMARY OF DISCLOSURE

In one implementation, a computer-implemented method is executed on a computing system and includes receiving telemetry data from a remote storage system. The telemetry data is analyzed to identify one or more issues with the remote storage system. One or more solutions are provided to the remote storage system based, at least in part, upon the one or more issues.

One or more of the following features may be included. The telemetry data may be gathered on the remote storage system. Providing one or more solutions to the remote storage system may include one or more of: installing one or more firmware upgrades on the remote storage system; installing one or more software upgrades on the remote storage system; providing one or more recommendations to an administrator of the remote storage system; and providing one or more incentives to the administrator of the remote storage system. Analyzing the telemetry data to identify one or more issues with the remote storage system may include analyzing one or more hardware components of the remote storage system for possible firmware upgrades. Analyzing the telemetry data to identify one or more issues with the remote storage system may include analyzing one or more software components of the remote storage system for possible software upgrades. Analyzing the telemetry data to identify one or more issues with the remote storage system may include analyzing one or more error codes of the remote storage system. The telemetry data may include one or more of usage data and system data.

In another implementation, a computer program product resides on a computer readable medium and has a plurality of instructions stored on it. When executed by a processor, the instructions cause the processor to perform operations including receiving telemetry data from a remote storage system. The telemetry data is analyzed to identify one or more issues with the remote storage system. One or more solutions are provided to the remote storage system based, at least in part, upon the one or more issues.

One or more of the following features may be included. The telemetry data may be gathered on the remote storage system. Providing one or more solutions to the remote storage system may include one or more of: installing one or more firmware upgrades on the remote storage system; installing one or more software upgrades on the remote storage system; providing one or more recommendations to an administrator of the remote storage system; and providing one or more incentives to the administrator of the remote storage system. Analyzing the telemetry data to identify one or more issues with the remote storage system may include analyzing one or more hardware components of the remote storage system for possible firmware upgrades. Analyzing the telemetry data to identify one or more issues with the remote storage system may include analyzing one or more software components of the remote storage system for possible software upgrades. Analyzing the telemetry data to identify one or more issues with the remote storage system may include analyzing one or more error codes of the remote storage system. The telemetry data may include one or more of usage data and system data.

In another implementation, a computing system including a processor and memory is configured to perform operations including receiving telemetry data from a remote storage system. The telemetry data is analyzed to identify one or more issues with the remote storage system. One or more solutions are provided to the remote storage system based, at least in part, upon the one or more issues.

One or more of the following features may be included. The telemetry data may be gathered on the remote storage system. Providing one or more solutions to the remote storage system may include one or more of: installing one or more firmware upgrades on the remote storage system; installing one or more software upgrades on the remote storage system; providing one or more recommendations to an administrator of the remote storage system; and providing one or more incentives to the administrator of the remote storage system. Analyzing the telemetry data to identify one or more issues with the remote storage system may include analyzing one or more hardware components of the remote storage system for possible firmware upgrades. Analyzing the telemetry data to identify one or more issues with the remote storage system may include analyzing one or more software components of the remote storage system for possible software upgrades. Analyzing the telemetry data to identify one or more issues with the remote storage system may include analyzing one or more error codes of the remote storage system. The telemetry data may include one or more of usage data and system data.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
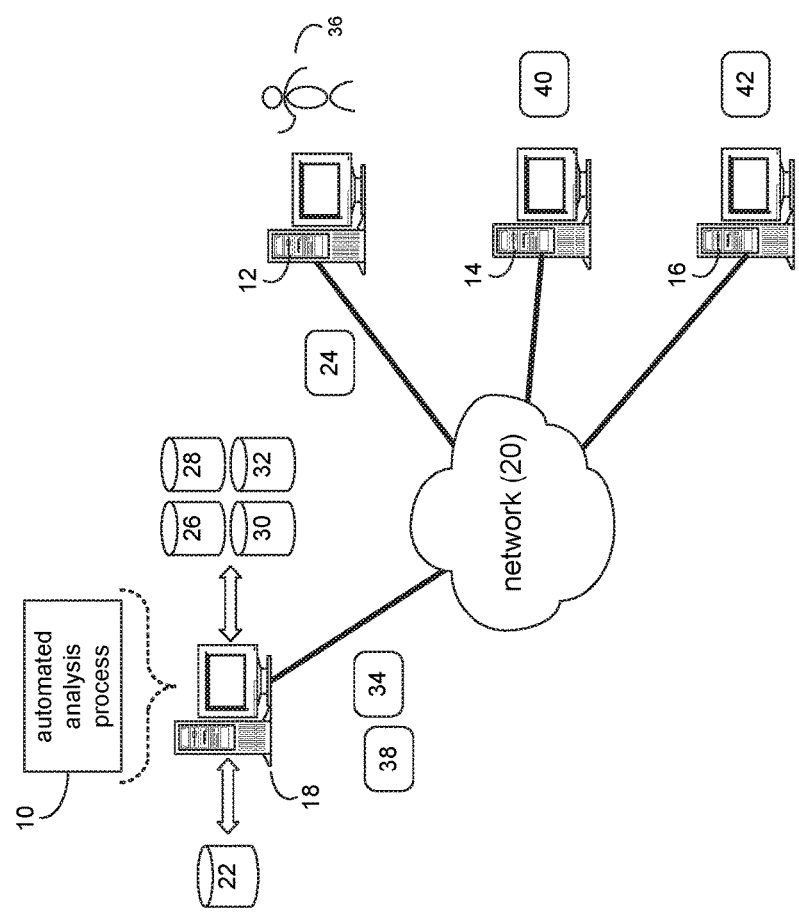
FIG. 1 is a diagrammatic view of a test system and an automated analysis process 10 coupled to a distributed computing network.

System Overview:

Referring to FIG. 1, there is shown automated analysis process 10. As will be discussed below in greater detail, automated analysis process 10 may be configured to analyze the operational "health" of a client system (e.g., client system 12), wherein the operational "health" of e.g., client system 12 may be compared to the operational "health" of other client systems (e.g., client system 14, 16). Automated analysis process 10 may be interfaced with an automated service engagement system, examples of which may include but are not limited to SR Generation and Field Personnel Dispatch offered by the EMC Corporation of Hopkinton, Mass.

Automated analysis process 10 may reside on and may be executed by computing device 18, which may be connected to network 20 (e.g., the Internet or a local area network). Examples of computing device 18 may include, but are not limited to: a personal computer, a server computer, a series of server computers, a mini computer, a mainframe computer and a cloud-based computing resource. In a preferred embodiment, computing device 18 may be a server or a series of servers within a cloud-based computing environment.

The instruction sets and subroutines of automated analysis process 10, which may be stored on storage device 22 coupled to computing device 18, may be executed by one or more processors (not shown) and one or more memory architectures (not shown) included within computing device 18. Examples of storage device 22 may include but are not limited to: a hard disk drive; a RAID device; a random access memory (RAM); a read-only memory (ROM); and all forms of flash memory storage devices.

Figure 2:
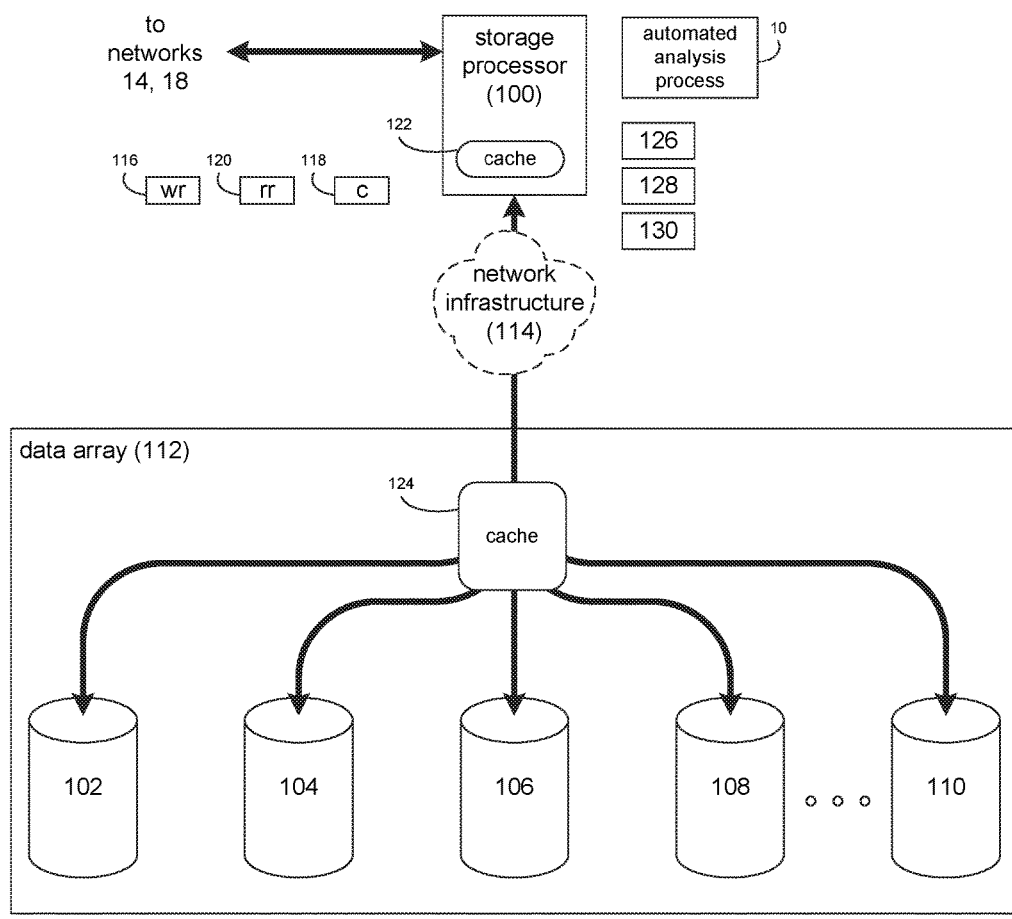
FIG. 2 is a diagrammatic view of the client system of FIG. 1.

Client Systems:

Referring also to FIG. 2, there is shown an example of a system that automated analysis process 10 may analyze (e.g., client system 12, client system 14 and/or client system 16). While in the following discussion, this illustrative example will define client system 12, client system 14 and/or client system 16 as a high-end RAID data array, this is for illustrative purposes only and is not intended to be a limitation of this disclosure, as other configurations are possible and are considered to be within the scope of this disclosure. For example, client system 12, client system 14 and/or client system 16 may be a more traditional computing system and/or storage device.

In this general example, client system 12, 14, 16 may include storage processor 100 and a plurality of storage targets (e.g. storage targets 102, 104, 106, 108, 110). Storage targets 102, 104, 106, 108, 110 may be configured to provide various levels of performance and/or high availability. For example, one or more of storage targets 102, 104, 106, 108, 110 may be configured as a RAID 0 array, in which data is striped across storage targets 102, 104, 106, 108, 110. By striping data across a plurality of storage targets, improved performance may be realized. However, RAID 0 arrays do not provide a level of high availability. Accordingly, one or more of storage targets 102, 104, 106, 108, 110 may be configured as a RAID 1 array, in which data is mirrored between storage targets 102, 104, 106, 108, 110. By mirroring data between storage targets, a level of high availability is achieved as multiple copies of the data are stored within client system 12, 14, 16.

While storage targets 102, 104, 106, 108, 110 are discussed above as being configured in a RAID 0 or RAID 1 array, this is for illustrative purposes only and is not intended to be a limitation of this disclosure, as other configurations are possible. For example, storage targets 102, 104, 106, 108, 110 may be configured as a JBOD, RAID 3, RAID 4, RAID 5, RAID 6 or RAID 7 array.

While in this particular example, client system 12, 14, 16 is shown to include five storage targets (e.g. storage targets 102, 104, 106, 108, 110), this is for illustrative purposes only and is not intended to be a limitation of this disclosure. Specifically, the actual number of storage targets may be increased or decreased depending upon e.g. the level of redundancy/performance/capacity required.

One or more of storage targets 102, 104, 106, 108, 110 may be configured to store coded data, wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage device.

Examples of storage targets 102, 104, 106, 108, 110 may include one or more electro-mechanical hard disk drives and/or solid-state/flash devices, wherein a combination of storage targets 102, 104, 106, 108, 110 and processing/control systems (not shown) may form data array 112.

The manner in which client system 12, 14, 16 is implemented may vary depending upon e.g. the level of redundancy/performance/capacity required. For example, client system 12, 14, 16 may be a RAID device in which storage processor 100 is a RAID controller card and storage targets 102, 104, 106, 108, 110 are individual "hot-swappable" hard disk drives. Another example of such a RAID device may include but is not limited to an NAS device. Alternatively, client system 12, 14, 16 may be configured as a SAN, in which storage processor 100 may be e.g., a server computer and each of storage targets 102, 104, 106, 108, 110 may be a RAID device and/or computer-based hard disk drives. Further still, one or more of storage targets 102, 104, 106, 108, 110 may be a SAN.

In the event that client system 12, 14, 16 is configured as a SAN, the various components of client system 12, 14, 16 (e.g. storage processor 100, storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Client system 12, 14, 16 may execute all or a portion of automated analysis process 10. The instruction sets and subroutines of automated analysis process 10, which may be stored on a storage device (not shown) coupled to storage processor 100, may be executed by one or more processors (not shown) and one or more memory architectures (not shown) included within storage processor 100. Examples of the storage device coupled to storage processor 100 may include but is not limited to: a hard disk drive; a RAID device; a random access memory (RAM); a read-only memory (ROM); and all forms of flash memory storage devices.

When storage processor 100 is configured as an application server, IO requests may be internally generated within storage processor 100. Examples of these IO requests may include but are not limited to data write request 116 (i.e. a request that content 118 be written to client system 12, 14, 16) and data read request 120 (i.e. a request that content 118 be read from client system 12, 14, 16). When storage processor 100 is configured as an application server, content 118 to be written to client system 12, 14, 16 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, 110.

The Automated Analysis Process:

All or a portion of automated analysis process 10 may reside on and may be executed by computing device 18 and/or client system 12, 14, 16. Accordingly, a first portion of automated analysis process 10 may be executed by e.g., client system 12 and a second portion of automated analysis process 10 may be executed by computing device 18. As discussed above, automated analysis process 10 may be configured to analyze the operational "health" of a client system (e.g., client system 12), wherein the operational "health" of e.g., client system 12 may be compared to the operational "health" of other client systems (e.g., client system 14, 16).

Figure 3:
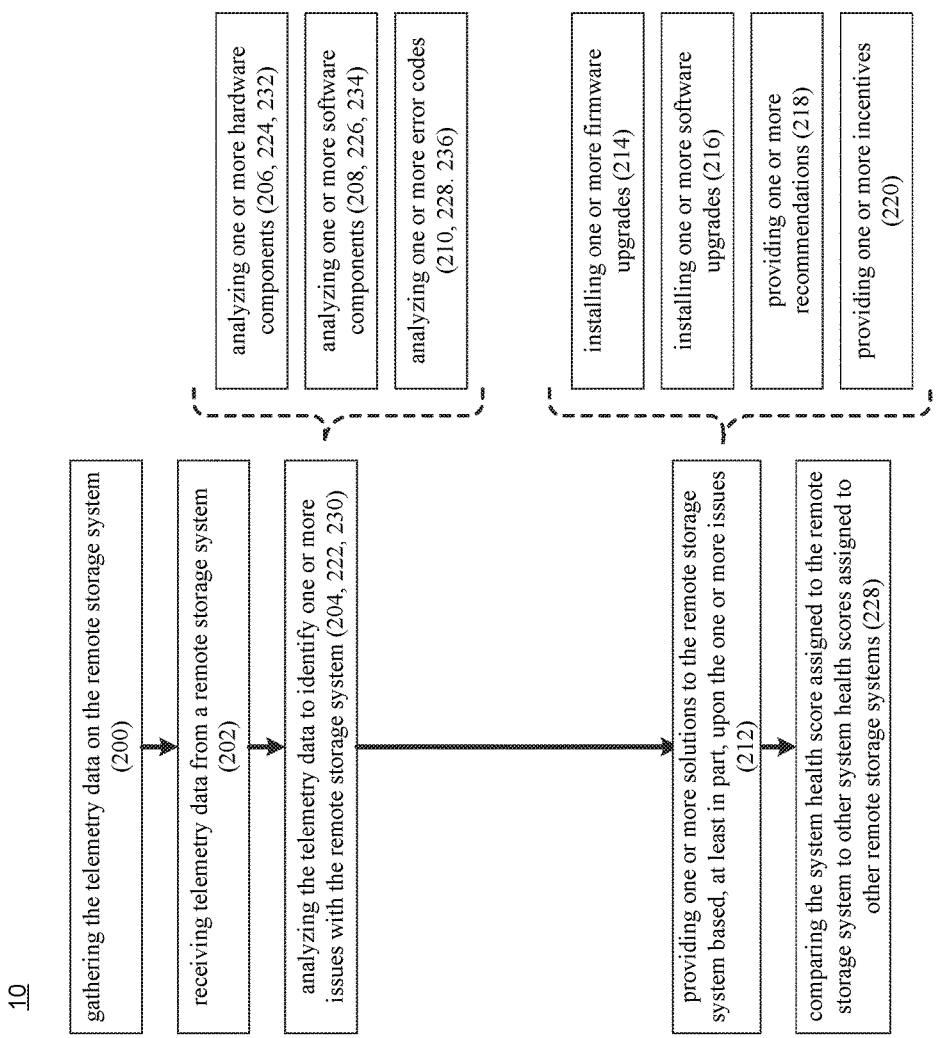
FIG. 3 is a flow chart of the automated analysis process of FIG. 1.

Referring also to FIG. 3, automated analysis process 10 may gather 200 telemetry data (e.g. telemetry data 24) on a remote storage system (e.g., client system 12), wherein telemetry data 24 may include any data that defines the manner in which client system 12 is utilized (e.g., usage data) and/or the condition of the components of client system 12 (e.g., system data).

An example of such usage data may include but are not limited to one or more log files that may define the manner in which client system 12 has been utilized (e.g., historical processor utilization, historical memory utilization, historical temperature readings, historical inbound bandwidth, historical outbound bandwidth, historical fan speeds, and historical cache utilization).

Examples of such system data may include but is not limited to: capacity data (e.g., the current amount of used/unused capacity on each of storage targets 102, 104, 106, 108, 110); SMART data (e.g., data concerning the physical characteristics of storage targets 102, 104, 106, 108, 110); firmware information (e.g., the current version of firmware on e.g., storage targets 102, 104, 106, 108, 110, network interface cards (not shown), and disk controllers (not shown)); driver information (e.g., the current version of drivers for e.g., storage targets 102, 104, 106, 108, 110, network interface cards (not shown), and disk controllers (not shown)); software information (e.g., the current software version for e.g., operating systems running on client system 12, applications running on client system 12, and/or services running on client system 12).

Once telemetry data 24 is gathered 200, automated analysis process 10 may receive 202 telemetry data 24 from a remote storage system (e.g., client system 12) and may analyze 204 telemetry data 24 to identify one or more issues with the remote storage system (e.g., client system 12).

When analyzing 204 telemetry data 24 to identify one or more issues with (in this example) client system 12, automated analysis process 10 may analyze 206 one or more hardware components of the remote storage system (e.g., client system 12) for possible firmware upgrades.

As discussed above, examples of such system data (which may be included in telemetry data 24) may include but are not limited to capacity data (e.g., the current amount of used/unused capacity on each of storage targets 102, 104, 106, 108, 110) and firmware information (e.g., the current version of firmware on e.g., storage targets 102, 104, 106, 108, 110, network interface cards (not shown), and disk controllers (not shown)).

Accordingly and when analyzing 206 hardware components within client system 12 for possible firmware upgrades, automated analysis process 10 may compare the current firmware versions included in the above-described hardware components to the latest firmware versions defined within e.g., firmware database 26. In the event that, during analysis 204, automated analysis process 10 determines that a newer firmware version is available for a specific hardware component (e.g., network interface card 126) within client system 12, automated analysis process 10 may identify network interface card 126 as needing a firmware upgrade.

Additionally and when analyzing 204 telemetry data 24 to identify one or more issues with (in this example) client system 12, automated analysis process 10 may analyze 208 one or more software components of the remote storage system (e.g., client system 12) for possible software upgrades.

As discussed above, examples of such system data (which may be included in telemetry data 24) may include but are not limited to: driver information (e.g., the current version of drivers for e.g., storage targets 102, 104, 106, 108, 110, network interface cards (not shown), and disk controllers (not shown)) and software information (e.g., the current software version for e.g., operating systems running on client system 12, applications running on client system 12, and/or services running on client system 12).

Accordingly and when analyzing 208 software components within client system 12 for possible software upgrades, automated analysis process 10 may compare the current versions of the drivers/software included in client system 12 to the latest drivers/software versions defined within e.g., driver/software database 28. In the event that, during analysis 204, automated analysis process 10 determines that a newer driver/software version is available for a specific piece of software (e.g., disk driver 128, reporting application 130) within client system 12, automated analysis process 10 may identify disk driver 128 and reporting application 130 as needing a driver upgrade and a software upgrade (respectively).

Further and when analyzing 204 telemetry data 24 to identify one or more issues with (in this example) client system 12, automated analysis process 10 may analyze 210 one or more error codes of the remote storage system (e.g., client system 12).

As discussed above, examples of such system data (which may be included in telemetry data 24) may include but are not limited to SMART data (e.g., data concerning the physical characteristics of storage targets 102, 104, 106, 108, 110).

Accordingly and when analyzing 210 error codes within client system 12, automated analysis process 10 may compare SMART data (e.g., data concerning the physical characteristics of storage targets 102, 104, 106, 108, 110) to acceptable SMART data values within e.g., SMART data database 30. In the event that, during analysis 204, automated analysis process 10 determines that any of the SMART data concerning e.g., storage target 102 is outside of acceptable limits, automated analysis process 10 may identify e.g., storage target 102 as failing.

Additionally and when analyzing 204 telemetry data 24 to identify one or more issues with (in this example) client system 12, automated analysis process 10 may analyze the above-described log files included within telemetry data 24. As discussed above, log files may define the manner in which client system 12 has been utilized (e.g., historical processor utilization, historical memory utilization, historical temperature readings, historical inbound bandwidth, historical outbound bandwidth, historical fan speeds, and historical cache utilization).

Accordingly and when analyzing the above-described log files of client system 12, automated analysis process 10 may compare these system statistics e.g., the historical processor utilization, the historical memory utilization, the historical temperature readings, the historical inbound bandwidth, the historical outbound bandwidth, the historical fan speeds, and the historical cache utilization to acceptable statistical ranges (as stored with e.g., statistics database 32). In the event that, during analysis 204, automated analysis process 10 determines that any of these system statistics are outside of their acceptable statistic range, automated analysis process 10 may identify e.g., one or more warnings.

Automated analysis process 10 may provide 212 one or more solutions (e.g., solutions 34) to the remote storage system (e.g., client system 12) based, at least in part, upon the one or more issues (e.g., network interface card 126 needing a firmware upgrade, disk driver 128 needing a driver upgrade, reporting application 130 needing a software upgrade, and storage target 102 failing). Solutions 34 maybe "self-healing" or may require interaction by e.g., administrator 36 of client system 12.

For example and when providing 212 one or more solutions to the remote storage system (e.g., client system 12), automated analysis process 10 may install 214 one or more firmware upgrades on the remote storage system (e.g., client system 12). For example, automated analysis process 10 may obtain the latest firmware version for network interface card 126, provide the same to client system 12, and install 214 the same on network interface card 126.

Further and when providing 212 one or more solutions to the remote storage system (e.g., client system 12), automated analysis process 10 may install 216 one or more software upgrades on the remote storage system (e.g., client system 12). For example, automated analysis process 10 may obtain the latest driver version of disk driver 128, provide the same to client system 12, and install 216 the same on client system 12. Further, automated analysis process 10 may obtain the latest software version of reporting application 130, provide the same to client system 12, and install 216 the same on client system 12.

Additionally and when providing 212 one or more solutions to the remote storage system (e.g., client system 12), automated analysis process 10 may provide 218 one or more recommendations to an administrator (e.g., administrator 36) of the remote storage system (e.g., client system 12). For example, automated analysis process 10 may notify administrator 36 that storage target 102 of client system 12 is failing and recommend that administrator 36 replace the same.

Further and when providing 212 one or more solutions to the remote storage system (e.g., client system 12), automated analysis process 10 may provide 220 one or more incentives to the administrator (e.g., administrator 36) of the remote storage system (e.g., client system 12). For example, assume that the above-described log files indicate that maintenance on data array 112 (e.g., defragmentation) is not performed frequently enough. Accordingly, automated analysis process 10 may encourage administrator 36 to perform this maintenance more frequently by e.g., offering a discount on a future service program for client system 12.

As discussed above, computing device 18 may be a server or a series of servers within a cloud-based computing environment. Accordingly, the above-described solutions (e.g., solutions 34) may be available/viewable within this cloud-based computing environment. For example, this cloud-based computing environment may be configured to allow administrator 36 of client system 12 log in and review solutions 34.

As discussed above, automated analysis process 10 may be configured to analyze telemetry data 24 so that one or more solutions (e.g., solutions 32) may be provided to (in this example) client system 12 and/or administrator 36.

Additionally/alternatively, automated analysis process 10 may analyze 222 telemetry data 24 to assign a system health score (e.g., system health score 38) to the remote storage system (e.g., client system 12), wherein system health score 38 may be provided to e.g., administrator 36 of client system 38. For example and when assigning system health score 38 to (in this example) client system 12, assume that each client system starts with a perfect health score of e.g., 100 points, wherein points are deducted from this perfect health score based upon the one or more issues identified within client system 12.

As discussed above and when analyzing 204 telemetry data 24 to identify one or more issues with client system 12, it was determined that e.g., network interface card 126 within client system 12 needed a firmware upgrade, disk driver 128 within client system 12 needed a driver upgrade, reporting application 130 within client system 12 needed a software upgrade, and storage target 102 was failing.

When analyzing 222 telemetry data 24 to assign a system health score (e.g., system health score 38) to the remote storage system (e.g., client system 32), automated analysis process 10 may analyze 224 one or more hardware components of the remote storage system (e.g., client system 32) for possible firmware upgrades.

Since network interface card 126 within client system 12 is in need of a firmware upgrade, automated analysis process 10 may deduct e.g., 10 points from the perfect health score of 100 (resulting in a health score of 90), as e.g., this firmware upgrade is of high importance since failure to install the same may result in e.g., packet loss within network interface card 126.

Additionally and when analyzing 222 telemetry data 24 to assign a system health score to the remote storage system (e.g., client system 32), automated analysis process 10 may analyze 226 one or more software components of the remote storage system (e.g., client system 32) for possible software upgrades.

Since disk driver 128 within client system 12 is in need of a driver upgrade, automated analysis process 10 may deduct e.g., 2 points from the current health score of 90 (resulting in a health score of 88), as e.g., this driver upgrade is of low importance since installing the same may only result in e.g., a very slight performance increase. Additionally, since reporting application 130 within client system 12 is in need of a software upgrade, automated analysis process 10 may deduct e.g., 5 points from the current health score of 88 (resulting in a health score of 83), as e.g., this software upgrade is of moderate importance since failure to install the same may result in e.g., client system 12 not taking advantage of enhanced system health reporting functionality.

When analyzing 222 telemetry data 24 to assign a system health score to the remote storage system (e.g., client system 32), automated analysis process 10 may analyze 228 one or more error codes of the remote storage system (e.g., client system 32).

Since storage target 102 is failing, automated analysis process 10 may deduct e.g., 15 points from the current health score of 83 (resulting in a health score of 68), as a failure of storage target 102 may heighten the potential for data loss within client system 12.

Accordingly and when analyzing 222 telemetry data 24 of client system 12, automated analysis process 10 may assign a system health score (e.g., system health score 38) of 68 points (out of a possible 100 points) to client system 12.

As discussed above, automated analysis process 10 may provide 212 one or more solutions (e.g., solutions 34) to the remote storage system (e.g., client system 12) based, at least in part, upon one or more issues identified within client system 12. Further and as discussed above, the above-described system health score (e.g., 68 points) is based, at least in part, upon these issues (e.g., network interface card 126 needing a firmware upgrade, disk driver 128 needing a driver upgrade, reporting application 130 needing a software upgrade, and storage target 102 failing). Accordingly, solutions 34 that address the issues identified within client system 12 may positively impact the above-described system health score (e.g., 68 points) once they are implemented.

Accordingly and when installing 214 e.g., a firmware upgrade on network interface card 126 of client system 12, the system health score (e.g., system health score 38) may be positively impacted by 10 points. Further and when installing 216 e.g., a driver upgrade on disk driver 128 of client system 12, the system health score (e.g., system health score 38) may be positively impacted by 2 points. Additionally and when installing 216 e.g., a software upgrade on reporting application 130 of client system 12, the system health score (e.g., system health score 38) may be positively impacted by 5 points. Further and when providing 218 one or more recommendations to an administrator (e.g., administrator 36) of the remote storage system (e.g., client system 12), the system health score (e.g., system health score 38) may be positively impacted by 15 points once failing storage target 102 is replaced. Additionally and when providing 220 one or more incentives to the administrator (e.g., administrator 36) of client system 12 (e.g., client system 12), the system health score (e.g., system health score 38) may be positively impacted if the incentives are accepted by administrator 36. For example, if administrator 36 agrees to more frequently perform maintenance on data array 112, the system health score (e.g., system health score 38) may be positively impacted (in addition to administrator 36 receiving a discount on a future service program for client system 12).

Automated analysis process 10 may compare 228 the system health score (e.g., system health score 38) assigned to the remote storage system (e.g., client system 12) to other system health scores (e.g., system health scores 40, 42) assigned to other remote storage systems (e.g., client systems 14, 16 respectively).

When comparing 228 e.g., system health score 38 to system health scores 40, 42, this comparison may be performed privately (e.g., when providing administrator 36 with system health score 38) or may be performed publically. As discussed above, computing device 18 may be a server or a series of servers within a cloud-based computing environment. Accordingly, the above-described comparison may be available/viewable within this cloud-based computing environment. When making the above-described comparison 228, automated analysis process 10 may utilize "big data" analytics that not only looks at historical data to analyze past health scores across multiple client systems but may also utilize data modelling to determine trends and make predictions concerning future health scores. For example, trends may be determined that indicate that e.g., certain regions/countries are more prone to certain types of failures than other regions/countries. Or that e.g., more failures occur during certain times of year than during other times of year. Or that hard disk drives having a certain type of "bad" SMART data that have their bandwidth exceed X MB/S more the y % of the time experience total failure at a rate six times greater that the same hard disk drive that has the same "bad" SMART data but only has one of the two other factors. As discussed above, the remote storage system (e.g., client system 12) may include a plurality of subsystems, wherein this plurality of subsystems may include hardware subsystems (e.g., disk drives, memory modules, network interface cards, disk controllers, power supplies, and cooling fans); software subsystems (e.g., applications, drivers, operating systems, and middleware); and process subsystems (e.g., replication processes, mirroring processes, RAID processes, and backup processes).

Further and as discussed above, automated analysis process 10 may analyze 222 telemetry data 24 to assign a system health score (e.g., system health score 38) to the remote storage system (e.g., client system 32).

Additionally/alternatively, automated analysis process 10 may analyze 230 telemetry data 24 to assign a subsystem health score to each of the plurality of subsystems (e.g., the hardware subsystems, the software subsystems, and the process subsystem) included within client system 12, thus defining a plurality of subsystem health scores.

Accordingly and when analyzing 230 telemetry data 24 to assign a subsystem health score to each of the plurality of subsystems, automated analysis process 10 may analyze 232 one or more hardware subsystems (e.g., disk drives, memory modules, network interface cards, disk controllers, power supplies, and cooling fans) of client system 12 for possible issues.

Additionally and when analyzing 230 telemetry data 24 to assign a subsystem health score to each of the plurality of subsystems, automated analysis process 10 may analyze 234 one or more software subsystems (e.g., applications, drivers, operating systems, and middleware) client system 12 for possible issues.

Further and when analyzing 230 telemetry data 24 to assign a subsystem health score to each of the plurality of subsystems, automated analysis process 10 may analyze 236 one or more process subsystems (e.g., replication processes, mirroring processes, RAID processes, and backup processes) client system 12 for possible issues.

Once all of these subsystems (e.g., hardware subsystems, software subsystems, and process subsystems) are assigned a component health score, automated analysis process 10 may assign a system health score (e.g., system health score 38) to the remote storage system (e.g., client system 12) based, at least in part, upon each of the subsystem health scores.

Specifically, by increasing the level of granularity at which a system health score (e.g., system health score 38) is assigned, more flexibility may be provided with respect to automated analysis process 10. For example, by compartmentalizing the manner in which a component health score is derived for a particular type of subsystem (e.g., a hard disk drive), if something needs to be changed in the future, automated analysis process 10 may be more easily updated since only a small portion of automated analysis process 10 will need to be modified (i.e., the manner in which a hard disk drive subsystem health score is determined). Further and in the event that a new type of subsystem (e.g., a compute subsystem) needs to be defined within client system 12, the manner in which a subsystem health score is determined for this new type of subsystems may be more easily defined (as it would not require modifying the existing system).

Further, by using such a component-based health scoring system, automated analysis process 10 may perform additional analysis and a more accurate system health score (e.g., system health score 38) may be realized. For example, assume that client system 12 included ten storage devices. Further assume that these ten storage devices are arranged into two RAID 5 arrays, each of which includes five storage devices. If two storage devices of the ten storages devices have SMART data that indicates that the storage device is failing, this may not be very concerning if each of the two RAID 5 arrays included only one of the failing storage devices. However, if one of the RAID 5 devices included both of the failing storage devices, this may be much more concerning.

Accordingly, when automated analysis process 10 is assigning system health score 38 to client system 12, automated analysis process 10 may determine if the two failing storage devices are associated with one RAID process. If not, automated analysis process 10 may reduce system health score 38 by e.g., 30 points (i.e., 15 points for each of the failing storage devices). However, if automated analysis process 10 determines that the two failing storage devices are associated with one RAID process, automated analysis process 10 may reduce system health score 38 by e.g., 50 points (i.e., 15 points for each of the failing storage devices plus an additional 20 points since the two failing storage devices are associated with one RAID process), since the likelihood of data loss is greater.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 18).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing system, comprising:
   receiving telemetry data from a remote storage system;
   analyzing the telemetry data to identify one or more issues with the remote storage system including analyzing one or more hardware components of the remote storage system for possible firmware upgrades and analyzing data associated with physical characteristics of one or more storage targets of the remote storage system;
   identifying one or more failing storage targets based upon, at least in part, the analysis of the data associated with the physical characteristics of one or more storage targets of the remote storage system and pre-defined acceptable storage target physical characteristic data;
   providing one or more solutions to the remote storage system based, at least in part, upon the one or more issues; and
   automatically installing one or more firmware upgrades on the remote storage system in response to the one or more solutions provided to the remote storage system.

2. The computer-implemented method of claim 1 further comprising:
   gathering the telemetry data on the remote storage system.

3. The computer-implemented method of claim 1 wherein providing one or more solutions to the remote storage system includes one or more of:
   installing one or more software upgrades on the remote storage system;
   providing one or more recommendations to an administrator of the remote storage system; and
   providing one or more incentives to the administrator of the remote storage system.

4. The computer-implemented method of claim 1 wherein analyzing the telemetry data to identify one or more issues with the remote storage system includes:
   analyzing one or more software components of the remote storage system for possible software upgrades.

5. The computer-implemented method of claim 1 wherein analyzing the telemetry data to identify one or more issues with the remote storage system includes:
   analyzing one or more error codes of the remote storage system.

6. The computer-implemented method of claim 1 wherein the telemetry data includes one or more of usage data and system data.

7. A computer program product residing on a non-transitory computer readable medium having a plurality of instructions stored thereon which, when executed by a processor, cause the processor to perform operations comprising:
   receiving telemetry data from a remote storage system;
   analyzing the telemetry data to identify one or more issues with the remote storage system including analyzing one or more hardware components of the remote storage system for possible firmware upgrades and analyzing data associated with physical characteristics of one or more storage targets of the remote storage system;
   identifying one or more failing storage targets based upon, at least in part, the analysis of the data associated with the physical characteristics of one or more storage targets of the remote storage system and pre-defined acceptable storage target physical characteristic data;
   providing one or more solutions to the remote storage system based, at least in part, upon the one or more issues; and
   automatically installing one or more firmware upgrades on the remote storage system in response to the one or more solutions provided to the remote storage system.

8. The computer program product of claim 7 further comprising instructions for: gathering the telemetry data on the remote storage system.

9. The computer program product of claim 7 wherein providing one or more solutions to the remote storage system includes one or more of:
   installing one or more software upgrades on the remote storage system;

providing one or more recommendations to an administrator of the remote storage system; and
providing one or more incentives to the administrator of the remote storage system.

10. The computer program product of claim 7 wherein analyzing the telemetry data to identify one or more issues with the remote storage system includes:
analyzing one or more software components of the remote storage system for possible software upgrades.

11. The computer program product of claim 7 wherein analyzing the telemetry data to identify one or more issues with the remote storage system includes:
analyzing one or more error codes of the remote storage system.

12. The computer program product of claim 7 wherein the telemetry data includes one or more of usage data and system data.

13. A computing system including a processor and memory configured to perform operations comprising:
receiving telemetry data from a remote storage system;
analyzing the telemetry data to identify one or more issues with the remote storage system including analyzing one or more hardware components of the remote storage system for possible firmware upgrades and analyzing data associated with physical characteristics of one or more storage targets of the remote storage system;
identifying one or more failing storage targets based upon, at least in part, the analysis of the data associated with the physical characteristics of one or more storage targets of the remote storage system and pre-defined acceptable storage target physical characteristic data;
providing one or more solutions to the remote storage system based, at least in part, upon the one or more issues; and
automatically installing one or more firmware upgrades on the remote storage system in response to the one or more solutions provided to the remote storage system.

14. The computing system of claim 13 further configured to perform operations comprising:
gathering the telemetry data on the remote storage system.

15. The computing system of claim 13 wherein providing one or more solutions to the remote storage system includes one or more of:
installing one or more software upgrades on the remote storage system;
providing one or more recommendations to an administrator of the remote storage system; and
providing one or more incentives to the administrator of the remote storage system.

16. The computing system of claim 13 wherein analyzing the telemetry data to identify one or more issues with the remote storage system includes:
analyzing one or more software components of the remote storage system for possible software upgrades.

17. The computing system of claim 13 wherein analyzing the telemetry data to identify one or more issues with the remote storage system includes:
analyzing one or more error codes of the remote storage system.

18. The computing system of claim 13 wherein the telemetry data includes one or more of usage data and system data.

* * * * *